(12) United States Patent
Naik et al.

(10) Patent No.: US 9,341,133 B2
(45) Date of Patent: May 17, 2016

(54) EXHAUST GAS RECIRCULATION CONTROL SYSTEMS AND METHODS

(71) Applicant: GM GLOBAL TECHNOLOGY OPERATIONS LLC, Detroit, MI (US)

(72) Inventors: Sanjeev M. Naik, Troy, MI (US); Vijay Ramappan, Novi, MI (US); Martino Casetti, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 456 days.

(21) Appl. No.: 13/786,944

(22) Filed: Mar. 6, 2013

(65) Prior Publication Data

US 2014/0257673 A1    Sep. 11, 2014

(51) Int. Cl.
| | |
|---|---|
| F02B 3/00 | (2006.01) |
| F02D 41/30 | (2006.01) |
| F02D 41/12 | (2006.01) |
| F02D 41/40 | (2006.01) |
| F02D 41/00 | (2006.01) |
| F02D 41/26 | (2006.01) |

(52) U.S. Cl.
CPC .............. *F02D 41/30* (2013.01); *F02D 41/005* (2013.01); *F02D 41/12* (2013.01); *F02D 41/402* (2013.01); *F02D 41/0062* (2013.01); *F02D 41/266* (2013.01)

(58) Field of Classification Search
CPC ....... F02D 41/30; F02D 41/12; F02D 41/005; F02D 41/402; F02D 41/266; F02D 41/0062
USPC .......... 701/101–105, 108; 123/445, 299, 305, 123/568.21, 568.11, 568.14, 568.16, 672; 60/602, 605.2
See application file for complete search history.

(56) References Cited

U.S. PATENT DOCUMENTS

| | | | |
|---|---|---|---|
| 4,081,725 | A | 3/1978 | Schmidt et al. |
| 4,404,946 | A | 9/1983 | Hoard et al. |
| 4,790,286 | A | 12/1988 | Nishida et al. |
| 4,836,174 | A | 6/1989 | Chujo et al. |
| 4,905,654 | A | 3/1990 | Katsuno et al. |
| 4,942,860 | A | 7/1990 | Chujo et al. |

(Continued)

FOREIGN PATENT DOCUMENTS

| | | |
|---|---|---|
| CN | 101932816 A | 12/2010 |
| CN | 101988432 A | 3/2011 |

(Continued)

OTHER PUBLICATIONS

U.S. Appl. No. 13/238,460, filed Sep. 21, 2011, Song et al.

(Continued)

*Primary Examiner* — Joseph Dallo (57) ABSTRACT

A fuel control system of a vehicle includes an injection control module and a command module. The injection control module determines a first target amount of fuel for a combustion event of an engine. A command module selectively command the injection control module to provide two fuel injections when a torque request decreases. In response to the command, the injection control module: determines second and third target amounts of fuel based on the first target amount; provides a first fuel injection during the combustion event based on the second target amount; and provides a second fuel injection during a compression stroke of the combustion event based on the third target amount.

18 Claims, 7 Drawing Sheets

(56) References Cited

U.S. PATENT DOCUMENTS

| | | | |
|---|---|---|---|
| 4,990,235 A | 2/1991 | Chujo | |
| 5,034,112 A | 7/1991 | Murase et al. | |
| 5,190,017 A | 3/1993 | Cullen et al. | |
| 5,205,260 A | 4/1993 | Takahashi et al. | |
| 5,207,093 A | 5/1993 | Maeda | |
| 5,465,617 A | 11/1995 | Dudek et al. | |
| 5,540,091 A | 7/1996 | Nakagawa | |
| 5,617,337 A | 4/1997 | Eidler et al. | |
| 5,639,961 A | 6/1997 | Lautenschutz | |
| 5,685,284 A | 11/1997 | Nakamichi | |
| 6,000,385 A | 12/1999 | Fukuma | |
| 6,029,451 A | 2/2000 | Gartner | |
| 6,164,270 A | 12/2000 | Bidner et al. | |
| 6,178,943 B1* | 1/2001 | Taga et al. | 123/295 |
| 6,240,365 B1 | 5/2001 | Bunn | |
| 6,309,534 B1 | 10/2001 | Fray et al. | |
| 6,311,679 B1 | 11/2001 | Druzhinina et al. | |
| 6,367,462 B1 | 4/2002 | McKay et al. | |
| 6,405,106 B1 | 6/2002 | Sheth et al. | |
| 6,505,603 B1* | 1/2003 | Schray et al. | 123/299 |
| 6,516,656 B1 | 2/2003 | Jetter et al. | |
| 6,575,148 B1 | 6/2003 | Bhargava et al. | |
| 6,581,370 B2 | 6/2003 | Sato et al. | |
| 6,609,493 B2* | 8/2003 | Yamaguchi et al. | 123/299 |
| 6,711,892 B2 | 3/2004 | Tamura et al. | |
| 6,732,031 B1 | 5/2004 | Lightner et al. | |
| 6,738,697 B2 | 5/2004 | Breed | |
| 6,739,177 B2 | 5/2004 | Sato et al. | |
| 6,772,586 B2 | 8/2004 | Miyahara et al. | |
| 6,802,302 B1 | 10/2004 | Li et al. | |
| 6,817,197 B1 | 11/2004 | Padfield | |
| 7,016,779 B2 | 3/2006 | Bowyer | |
| 7,104,259 B2 | 9/2006 | Terada | |
| 7,155,332 B2 | 12/2006 | Yamada et al. | |
| 7,181,335 B2 | 2/2007 | Barba et al. | |
| 7,181,908 B2* | 2/2007 | Naik | 60/295 |
| 7,195,009 B2 | 3/2007 | Cullen | |
| 7,254,477 B1 | 8/2007 | Banks | |
| 7,261,098 B2 | 8/2007 | Vigild et al. | |
| 7,267,117 B2 | 9/2007 | Tonetti et al. | |
| 7,318,409 B2 | 1/2008 | Cullen | |
| 7,398,775 B2 | 7/2008 | Cullen | |
| 7,400,967 B2 | 7/2008 | Ueno et al. | |
| 7,409,275 B2 | 8/2008 | Sakurai et al. | |
| 7,463,960 B2 | 12/2008 | Thiel et al. | |
| 7,474,954 B1 | 1/2009 | Zagone | |
| 7,526,950 B2 | 5/2009 | Van Nieuwstadt et al. | |
| 7,532,963 B1 | 5/2009 | Lowrey et al. | |
| 7,565,892 B1* | 7/2009 | Cleary et al. | 123/295 |
| 7,565,901 B2 | 7/2009 | Furuta et al. | |
| 7,620,490 B2 | 11/2009 | Matsunaga | |
| 7,650,211 B2 | 1/2010 | Wang et al. | |
| 7,654,253 B2 | 2/2010 | Cullen | |
| 7,715,976 B1 | 5/2010 | Xiao et al. | |
| 7,974,749 B2 | 7/2011 | Zettel et al. | |
| 8,042,528 B2 | 10/2011 | Gates et al. | |
| 8,103,428 B2* | 1/2012 | Russ et al. | 701/108 |
| 8,127,816 B2 | 3/2012 | Gnan | |
| 8,315,759 B2 | 11/2012 | Bauerle | |
| 8,469,010 B2 | 6/2013 | Inoue | |
| 8,521,354 B2 | 8/2013 | Sasaki | |
| 8,543,317 B2 | 9/2013 | Pasero et al. | |
| 8,733,081 B2 | 5/2014 | Miyashita | |
| 9,080,528 B2 | 7/2015 | Aoyagi | |
| 2002/0066442 A1 | 6/2002 | Muller et al. | |
| 2002/0139360 A1 | 10/2002 | Sato et al. | |
| 2003/0106367 A1 | 6/2003 | Osaki et al. | |
| 2003/0115854 A1 | 6/2003 | Tamura et al. | |
| 2003/0159521 A1 | 8/2003 | Sarholz et al. | |
| 2004/0061290 A1 | 4/2004 | Gray | |
| 2004/0079332 A1 | 4/2004 | Kotwicki | |
| 2004/0230345 A1 | 11/2004 | Tzamaloukas | |
| 2005/0072411 A1 | 4/2005 | Cullen | |
| 2005/0131620 A1 | 6/2005 | Bowyer | |
| 2005/0139193 A1 | 6/2005 | Kobayashi et al. | |
| 2005/0161029 A1 | 7/2005 | Ishikawa | |
| 2005/0274369 A1 | 12/2005 | Tonetti et al. | |
| 2006/0048760 A1 | 3/2006 | Matsunaga et al. | |
| 2006/0064228 A1 | 3/2006 | Huang | |
| 2006/0213490 A1 | 9/2006 | Vigild et al. | |
| 2007/0005609 A1 | 1/2007 | Breed | |
| 2007/0021901 A1* | 1/2007 | Yamaguchi et al. | 701/105 |
| 2007/0062499 A1 | 3/2007 | Miyasako et al. | |
| 2007/0100519 A1 | 5/2007 | Engel | |
| 2007/0174003 A1* | 7/2007 | Ueno et al. | 701/104 |
| 2007/0181111 A1 | 8/2007 | Cullen | |
| 2007/0192018 A1* | 8/2007 | Gibson et al. | 701/110 |
| 2008/0178836 A1* | 7/2008 | Yamashita et al. | 123/295 |
| 2008/0178853 A1 | 7/2008 | Yamaoka et al. | |
| 2008/0189009 A1 | 8/2008 | Wang et al. | |
| 2008/0270012 A1 | 10/2008 | Cullen | |
| 2008/0316006 A1 | 12/2008 | Bauman et al. | |
| 2009/0038308 A1 | 2/2009 | Nagae | |
| 2009/0132153 A1* | 5/2009 | Shutty et al. | 701/108 |
| 2009/0198431 A1 | 8/2009 | Cleary et al. | |
| 2009/0254245 A1 | 10/2009 | Bauerle | |
| 2010/0042284 A1 | 2/2010 | Sasaki | |
| 2010/0077990 A1* | 4/2010 | Shishime et al. | 123/299 |
| 2010/0185379 A1 | 7/2010 | Burkhardt et al. | |
| 2010/0199665 A1* | 8/2010 | Kapus | 60/602 |
| 2010/0224174 A1 | 9/2010 | Tabata | |
| 2010/0307140 A1 | 12/2010 | Viola et al. | |
| 2011/0011378 A1 | 1/2011 | Nakamura | |
| 2011/0023847 A1 | 2/2011 | Gates et al. | |
| 2011/0054762 A1 | 3/2011 | Nakayama et al. | |
| 2011/0072793 A1 | 3/2011 | Bidner et al. | |
| 2011/0073086 A1 | 3/2011 | Bahlo et al. | |
| 2011/0077838 A1 | 3/2011 | Osburn et al. | |
| 2011/0166767 A1* | 7/2011 | Kurtz et al. | 701/103 |
| 2011/0172897 A1* | 7/2011 | Tsuzuki et al. | 701/103 |
| 2011/0191010 A1* | 8/2011 | Russ et al. | 701/108 |
| 2011/0209685 A1* | 9/2011 | Shane et al. | 123/299 |
| 2012/0016571 A1* | 1/2012 | Nada | 701/104 |
| 2012/0046854 A1 | 2/2012 | Sangkyu et al. | |
| 2012/0053821 A1* | 3/2012 | Wolfe et al. | 701/105 |
| 2012/0116648 A1 | 5/2012 | Russ et al. | |
| 2012/0227714 A1 | 9/2012 | Surnilla et al. | |
| 2012/0227719 A1 | 9/2012 | Surnilla et al. | |
| 2012/0247439 A1 | 10/2012 | Ramappan et al. | |
| 2012/0303346 A1 | 11/2012 | Takezoe et al. | |
| 2013/0054122 A1 | 2/2013 | Aoyagi | |
| 2013/0199177 A1 | 8/2013 | Holberg et al. | |
| 2013/0238218 A1 | 9/2013 | Wiggins et al. | |
| 2013/0253802 A1 | 9/2013 | Miyamoto et al. | |
| 2013/0332050 A1 | 12/2013 | Song et al. | |
| 2014/0149015 A1 | 5/2014 | Pursifull | |
| 2014/0257673 A1 | 9/2014 | Naik et al. | |

FOREIGN PATENT DOCUMENTS

| | | |
|---|---|---|
| CN | 202510230 U | 10/2012 |
| EP | 1481295 A1 | 12/2004 |
| JP | 63140856 A | 6/1988 |
| JP | 63159664 A | 7/1988 |
| JP | 405118246 | 5/1993 |
| JP | 2003148258 A | 5/2003 |
| JP | 2006029084 A | 2/2006 |
| JP | 2008087480 A | 4/2008 |
| JP | 2008248888 A | 10/2008 |
| JP | 2009243283 A | 10/2009 |
| JP | 2009287491 A | 12/2009 |
| JP | 2010203281 A | 9/2010 |
| WO | WO-03065135 A1 | 7/2003 |
| WO | WO-2004027244 A1 | 4/2004 |
| WO | WO-2009118605 A1 | 10/2009 |
| WO | WO-2011145223 A1 | 11/2011 |

OTHER PUBLICATIONS

U.S. Appl. No. 13/408,577, filed Feb. 29, 2012, Wasberg et al.
U.S. Appl. No. 13/425,723, filed Mar. 21, 2012, Ramappan et al.
U.S. Appl. No. 13/440,570, filed Apr. 5, 2012, Song et al.
U.S. Appl. No. 13/490,821, filed Jun. 7, 2012, Wiggins et al.
U.S. Appl. No. 13/490,885, filed Jun. 7, 2012, Song et al.

(56) References Cited

OTHER PUBLICATIONS

U.S. Appl. No. 13/967,660, filed Aug. 15, 2013, Song et al.
U.S. Appl. No. 13/967,591, filed Aug. 15, 2013, Song et al.
U.S. Appl. No. 13/425,723, filed Mar. 21, 2012, Vijay Ramappan et al.
U.S. Appl. No. 13/408,577, filed Feb. 29, 2012, Jon C. Wasberg et al.
U.S. Appl. No. 13/238,460, filed Sep. 21, 2011, B. Jerry Song et al.
U.S. Appl. No. 13/440,570, filed Apr. 5, 2012, B. Jerry Song et al.
SST Sensing Ltd, "Operating Principle and Construction of Zirconium Dioxide Oxygen Sensors," 2010, p. 1-14.

* cited by examiner

EXHAUST GAS RECIRCULATION CONTROL SYSTEMS AND METHODS

FIELD

The present disclosure relates to internal combustion engines and more specifically to exhaust gas recirculation control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts air and fuel to generate torque. Air flows into the engine through an intake system. The intake system may include a throttle valve and an intake manifold. Fuel is provided by one or more fuel injectors. The engine outputs torque to a transmission. The transmission transfers torque to one or more wheels. Exhaust resulting from combustion is expelled from the engine to an exhaust system.

An exhaust gas recirculation (EGR) system re-circulates exhaust back to the intake system. For exhaust to flow back to the intake system, pressure within the exhaust system must be greater than a pressure where the exhaust enters the intake system. The EGR system maybe controlled such that a target mixture of exhaust, air, and fuel is provided to each cylinder. The engine may not operate as intended when the target mixture is not maintained.

SUMMARY

A fuel control system of a vehicle includes an injection control module and a command module. The injection control module determines a first target amount of fuel for a combustion event of an engine. A command module selectively command the injection control module to provide two fuel injections when a torque request decreases. In response to the command, the injection control module: determines second and third target amounts of fuel based on the first target amount; provides a first fuel injection during the combustion event based on the second target amount; and provides a second fuel injection during a compression stroke of the combustion event based on the third target amount.

In further features, the fuel control system further includes an enabling/disabling module that disables the command module when a decrease in the torque request is less than a predetermined value.

In yet further features, the fuel control system further includes an enabling/disabling module that disables the command module when a decrease in a target mass fraction of recirculated exhaust gas is less than a predetermined value.

In still further features, the command module determines whether to command the injection control module to provide two fuel injections based on a difference between an estimated mass fraction of recirculated exhaust gas in a gas charge of the combustion event and a target mass fraction of recirculated exhaust gas for the combustion event.

In further features, the command module commands the injection control module to provide two fuel injections when the difference is greater than a predetermined value.

In yet further features, the fuel control system further includes a threshold determination module that determines the predetermined value based on an engine speed.

In still further features, the fuel control system further includes a threshold determination module that determines the predetermined value based on an engine load.

In further features, the injection control module begins and ends the second fuel injection during the compression stroke of the combustion event.

In yet further features, the injection control module determines the second and third target amounts further based on a predetermined percentage.

In still further features, the injection control module determines the predetermined percentage based on at least one of an engine speed and an engine load.

A fuel control method for a vehicle, includes: determining a first target amount of fuel for a combustion event of an engine; and selectively commanding provision of two fuel injections when a torque request decreases. The fuel control method further includes, in response to the command: determining second and third target amounts of fuel based on the first target amount; providing a first fuel injection during the combustion event based on the second target amount; and providing a second fuel injection during a compression stroke of the combustion event based on the third target amount.

In further features, the fuel control method further includes preventing the commanding when a decrease in the torque request is less than a predetermined value.

In still further features, the fuel control method further includes preventing the commanding when a decrease in a target mass fraction of recirculated exhaust gas is less than a predetermined value.

In yet further features, the fuel control method further includes determining whether to command provision of two fuel injections based on a difference between an estimated mass fraction of recirculated exhaust gas in a gas charge of the combustion event and a target mass fraction of recirculated exhaust gas for the combustion event.

In further features, the fuel control method further includes commanding provision of two fuel injections when the difference is greater than a predetermined value.

In still further features, the fuel control method further includes determining the predetermined value based on an engine speed.

In yet further features, the fuel control method further includes determining the predetermined value based on an engine load.

In further features, the fuel control method further includes beginning and ending the second fuel injection during the compression stroke of the combustion event.

In still further features, the fuel control method further includes determining the second and third target amounts further based on a predetermined percentage.

In yet further features, the fuel control method further includes determining the predetermined percentage based on at least one of an engine speed and an engine load.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to produce drive torque for a vehicle. The engine outputs exhaust resulting from combustion to an exhaust system. An exhaust gas recirculation (EGR) system re-circulates exhaust from the exhaust system back to an intake system.

A gas charge is drawn into a cylinder of the engine for each combustion event of the engine. The gas charge may include air drawn through a throttle valve, exhaust recirculated via the EGR system, and one or more other gasses, such as fuel vapor from a vapor purge system.

An engine control module (ECM) generates target mass fractions of air, EGR, and fuel vapor for combustion events and controls actuators based on the targets. Under some circumstances, however, the EGR mass fraction target may decrease and the actual EGR mass fraction may increase. For example only, the ECM may decrease the EGR mass fraction target when the driver releases an accelerator pedal while the vehicle is moving. The actual mass fraction of EGR, however, may increase after the driver releases the accelerator pedal.

When the EGR mass fraction target decreases and the actual mass fraction of EGR may increase, the ECM of the present disclosure splits fueling into two separate injections. The later one of the two fuel injections is performed during the compression stroke of a combustion event to provide a stratified charge. The provision of two separate fuel injections where the later one of the injections is performed during the compression stroke may provide smoother engine operation as compared to operating using a single fuel injection.

Figure 1A:
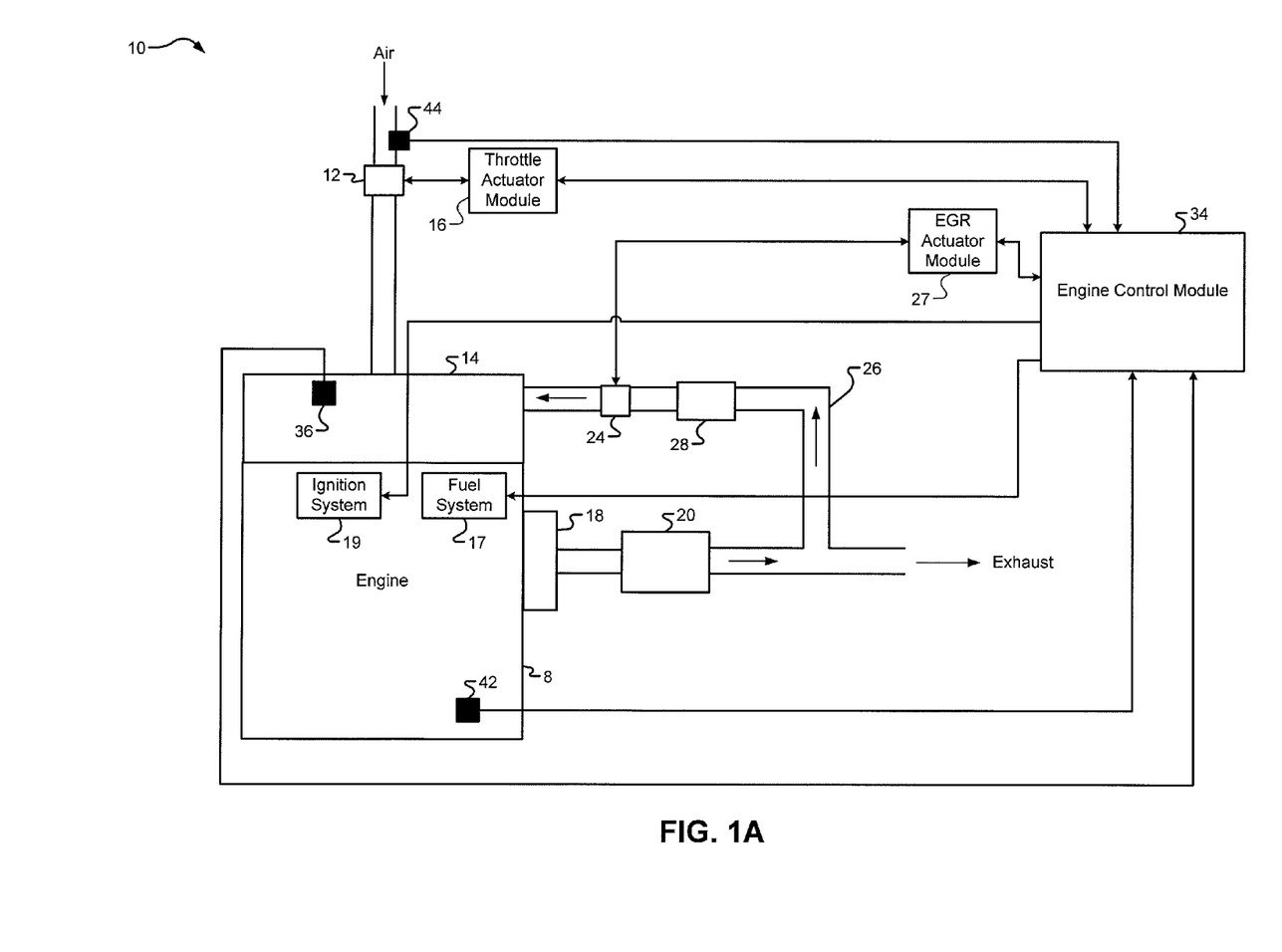
FIGS. 1A and 1B are functional block diagrams of example engine systems according to the present disclosure.
Figure 1B:
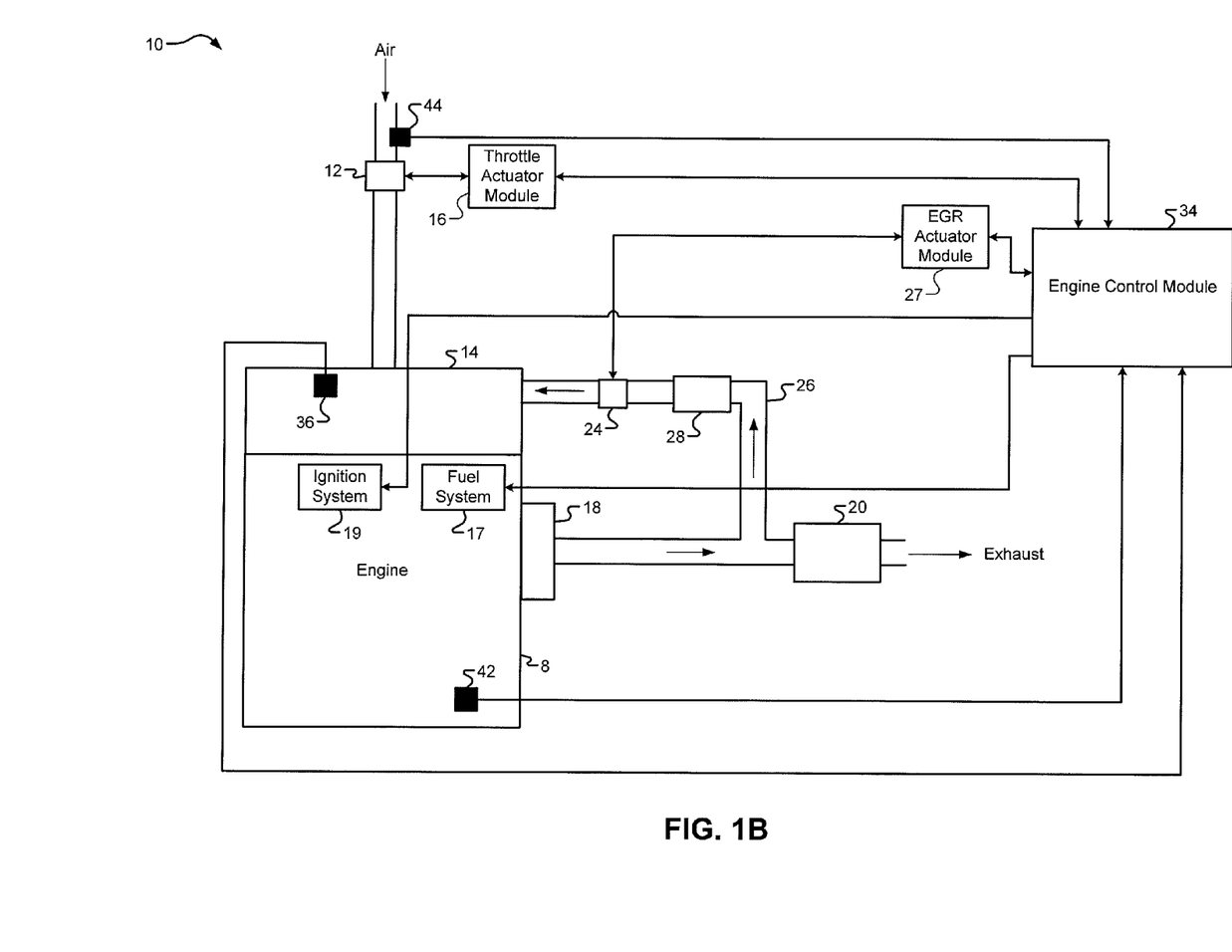

Referring now to FIGS. 1A and 1B, functional block diagrams of examples of an engine system 10 are presented. While the engine system 10 will be discussed in terms of a spark ignition engine system, the present application is also applicable to other types of engine systems including compression ignition engine systems and hybrid engine systems.

Air is drawn into an engine 8 through an intake system. The intake system may include a throttle valve 12 and an intake manifold 14. Air may flow into the engine 8 through the throttle valve 12 and the intake manifold 14. The throttle valve 12 regulates airflow into the intake manifold 14. A throttle actuator module 16 controls actuation of the throttle valve 12. The engine 8 combusts an air/fuel mixture within cylinders of the engine 8. A fuel system 17 selectively injects fuel into the engine 8. An ignition system 19 selectively provides spark to the engine 8 for combustion.

Combustion of the air/fuel mixture drives a crankshaft and produces exhaust. The engine 8 outputs the exhaust to an exhaust manifold 18. A catalyst 20 receives the exhaust from the exhaust manifold 18 and reacts with various components of the exhaust. For example only, the catalyst 20 may include a three-way catalyst (TWC), a catalytic converter, or another suitable type of catalyst.

An EGR system selectively recirculates a portion of the exhaust back to the intake system. While recirculation of exhaust back to the intake manifold 14 is shown and will be discussed, exhaust can be recirculated back to other locations in the intake system. The EGR system includes an EGR valve 24 and an EGR conduit 26. Operation of the engine 8 creates a vacuum (low pressure relative to ambient pressure) within the intake manifold 14. Opening the EGR valve 24 allows exhaust to be recirculated back to the intake manifold 14. An EGR actuator module 27 may control actuation of the EGR valve 24.

The EGR system may also include an EGR cooler 28 that cools exhaust as the exhaust flows through the EGR cooler 28 on its way back to the intake manifold 14. In various implementations, the EGR system may further include a cooler bypass system that can be controlled to allow exhaust to bypass the EGR cooler 28 on its way back to the intake manifold 14. The exhaust may be recirculated back to the intake manifold 14 from downstream of the catalyst 20 as shown in FIG. 1A. As shown in FIG. 1B, the exhaust may alternatively be recirculated back to the intake manifold 14 from upstream of the catalyst 20.

While the present disclosure is shown in the context of a naturally aspirated engine, the present disclosure is also applicable to engines with one or more boost devices, such as turbochargers, superchargers, or combinations thereof. Engines with one or more boost devices may include different EGR systems using different locations for where exhaust gas is drawn from (e.g., from an exhaust manifold or downstream of a turbocharger turbine) and/or where exhaust gas is provided to the intake system (e.g., upstream of the intake manifold or upstream of a turbocharger compressor).

An engine control module (ECM) 34 regulates operation of the engine system 10. For example, the ECM 34 may control opening of the throttle valve 12 via the throttle actuator module 16, opening of the EGR valve 24 via the EGR actuator module 27, fuel injection amount and timing via the fuel system 17, and spark timing via the ignition system 19. The ECM 34 may also control the operation of the intake and exhaust valve actuators, boost devices, and/or one or more other suitable engine actuators.

The ECM 34 communicates with various sensors, such as a manifold absolute pressure (MAP) sensor 36, an engine speed sensor 42, a mass air flow (MAF) sensor 44, and/or one or more other suitable sensors. The MAP sensor 36 generates a MAP signal indicating an absolute pressure in the intake manifold 14. The engine speed sensor 42 generates a signal based on rotation of the crankshaft. An engine speed, in revolutions per minute (RPM), can be determined based on the rotation of the crankshaft. The MAF sensor 44 generates a MAF signal indicating mass flowrate of air into the intake manifold 14.

Figure 2:
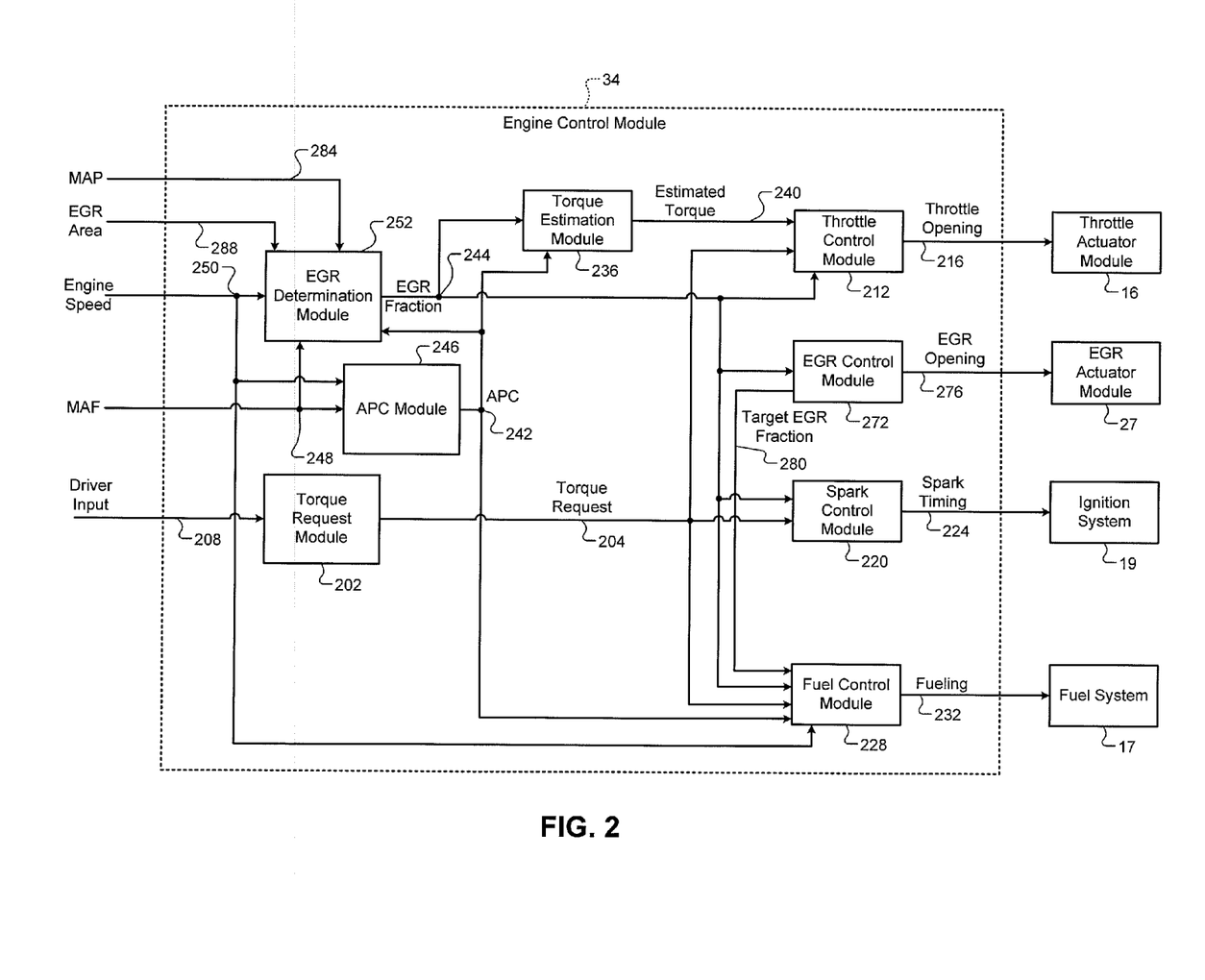
FIG. 2 is a functional block diagram of an example engine control system according to the present disclosure.

Referring now to FIG. 2, a functional block diagram of an example implementation of the ECM 34 is presented. A torque request module 202 may determine a torque request 204 based on one or more driver inputs 208, such as an accelerator pedal position, a brake pedal position, a cruise control input, and/or one or more other suitable driver inputs. The torque request module 202 may determine the torque request 204 additionally or alternatively based on one or more other torque requests, such as torque requests generated by the ECM 34 and/or torque requests received from other modules of the vehicle, such as a transmission control module, a hybrid control module, a chassis control module, etc. One or more engine actuators may be controlled based on the torque request 204 and/or one or more other vehicle operating parameters.

For example, a throttle control module 212 may determine a target throttle opening 216 based on the torque request 204. The throttle actuator module 16 may adjust opening of the throttle valve 12 based on the target throttle opening 216. A spark control module 220 may determine a target spark timing 224 based on the torque request 204. The ignition system 19 may generate spark based on the target spark timing 224. A fuel control module 228 may determine one or more target fueling parameters 232 based on the torque request 204. For example, the target fueling parameters 232 may include number of fuel injection pulses (per combustion event), timing for each pulse, and amount for each pulse. The fuel system 17 may inject fuel based on the target fueling parameters 232.

A torque estimation module 236 may estimate a torque output of the engine 8. The estimated torque output of the engine 8 will be referred to as an estimated torque 240. The throttle control module 212 may selectively adjust the target throttle opening 216 based on the estimated torque 240. For example, the throttle control module 212 may use the estimated torque 240 to perform closed-loop control of one or more engine air flow parameters, such as throttle area, MAP, and/or one or more other suitable air flow parameters.

The torque estimation module 236 may determine the estimated torque 240 using a torque relationship. For example, the torque estimation module 236 may determine the estimated torque 240 using the relationship:

$$T = f(APC, S, I, E, AF, OT, \#, EGR),$$

where torque (T) is the estimated torque 240 and is a function of air per cylinder (APC) 242, spark advance/timing (S), intake opening timing and duration (I), exhaust opening timing and duration (E), air/fuel ratio (AF), oil temperature (OT), number of activated cylinders (#), and EGR mass fraction (EGR) 244. This relationship may be embodied as an equation and/or as a mapping (e.g., lookup table).

An APC module 246 may determine the APC 242, for example, based on a MAF 248 and an engine speed 250. The MAF 248 may be measured using the MAF sensor 44. The engine speed 250 may be measured using the engine speed sensor 42. The APC 242 may correspond to a mass of air expected to be trapped within a cylinder for a combustion event.

An EGR determination module 252 determines the EGR mass fraction 244 as discussed further below. The EGR mass fraction 244 may correspond to an expected mass fraction of EGR to the (total) mass of a gas charge of a next combustion event of the engine 8.

The spark control module 220 may determine the target spark timing 224 using a spark relationship. The spark relationship may be based on the torque relationship above, inverted to solve for target spark timing. For example only, for a given torque request ($T_{Req}$), the spark control module 220 may determine the target spark timing 224 using the relationship:

$$S_T = f^{-1}(T_{Req}, APC, I, E, AF, OT, \#, EGR).$$

The spark relationship may be embodied as an equation and/or as a lookup table. The air/fuel ratio (AF) may be the actual air/fuel ratio, for example, as reported by the fuel control module 228.

One or more other engine actuators may additionally or alternatively be controlled based on the EGR mass fraction 244. For example, an EGR control module 272 may determine a target EGR opening 276 based on the EGR mass fraction 244 and a target EGR mass fraction 280. The EGR control module 272 may determine the target EGR mass fraction 280, for example, based on the torque request 204 and/or one or more other suitable parameters. The EGR actuator module 27 may control opening of the EGR valve 24 based on the target EGR opening 276. The fuel control module 228 selectively adjusts one or more of the target fueling parameters 232 based on the EGR mass fraction 244, as discussed further below.

The EGR determination module 252 may determine a steady-state (SS) EGR flowrate. The SS EGR flowrate corresponds to a mass flowrate of EGR back to the intake manifold 14 under SS EGR conditions. SS EGR conditions may refer to times when the SS EGR flowrate varies less than a predetermined amount over a predetermined period.

The EGR determination module 252 may determine the SS EGR flowrate using the relationship:

$$\dot{m}_{EGR} = \frac{C_D * A_T * p_O}{\sqrt{R * T_O}} * \left(\frac{p_T}{p_O}\right)^{\frac{1}{\gamma}} * \left\{\frac{2 * \gamma}{\gamma - 1} * \left[1 - \left(\frac{p_T}{p_O}\right)^{\frac{(\gamma-1)}{\gamma}}\right]\right\}^{\frac{1}{2}}$$

where ($\dot{m}_{EGR}$) is the (present) mass flowrate of EGR back to the engine 8 via the EGR system (i.e., the SS EGR flowrate) and is a function of opening area ($A_T$) of the EGR valve 24, pressure ($p_O$) upstream of the EGR valve 24, a temperature ($T_O$), pressure ($p_T$) downstream of the EGR valve 24 (e.g., a pressure within the intake manifold 14), and various constants ($C_D$, R, γ). This relationship may be embodied as equation, such as the equation above, or as a mapping (e.g., a lookup table) that relates the above parameters to the SS EGR flowrate. The pressure within the intake manifold 14 may be MAP 284 measured using the MAP sensor 36. An EGR position sensor may measure a position of the EGR valve 24, and opening area 288 of the EGR valve 24 may be determined based on the position of the EGR valve 24.

For each combustion event of the engine 8, a gas charge is drawn into a cylinder. The gas charge may include: ambient air drawn through the throttle valve 12; and exhaust gas recirculated back via the EGR system. The gas charge may also include one or more other gasses, such as fuel vapor provided by a fuel vapor purge system (not shown).

The EGR determination module 252 determines a SS EGR fraction for a next combustion event of the engine 8. The SS EGR fraction corresponds to a mass fraction of EGR under SS EGR conditions to the mass of the gas charge of the next combustion event of the engine 8. The EGR determination module 252 determines the SS EGR fraction for the next combustion event based on the SS EGR flowrate and the MAF 248. The EGR determination module 252 may determine the SS EGR fraction for the next combustion event, for example, using the equation:

$$SSFraction = \frac{\dot{m}_{EGR}}{\dot{m}_{EGR} + \dot{m}_{MAF}},$$

where SSFraction is the SS EGR fraction and is a function of the SS EGR flowrate ($\dot{m}_{EGR}$) and the MAF ($\dot{m}_{MAF}$) 248.

The EGR determination module 252 may include a ring buffer, a first-in first-out (FIFO) buffer, a shift register, etc. Each time the SS EGR fraction is determined, the EGR determination module 252 stores the SS EGR fraction and an oldest stored value of the SS EGR fraction is removed. The EGR determination module 252 includes a predetermined number of the most recently determined values of the SS EGR fraction.

The EGR determination module 252 determines the EGR mass fraction 244 for the next combustion event of the engine 8 based on a plurality of the stored values of the SS EGR fraction. The EGR determination module 252 may determine the EGR mass fraction 244 for the next combustion event based on an average, such as a weighted average, of a plurality of the stored values of the SS EGR fraction. The values of the SS EGR fraction used to determine the EGR mass fraction 244 may be the most recently determined/stored values.

The EGR determination module 252 may determine the EGR mass fraction 244 for the next combustion event, for example, using the equation:

$$EGRFraction = \frac{\left(\sum_{i=0}^{t-d}(t-d-i)*SSFrac_{t-1-i}\right)}{\left(\sum_{i=0}^{t-d}(t-d-i)\right)},$$

where EGRFraction is the EGR mass fraction 244, t is a number of combustion events between a combustion event of the engine 8 and a later combustion event where the EGR mass fraction 244 will reach SS (and therefore be equal to the SS EGR fraction) after a transient EGR condition occurs, d is a number of combustion events between a combustion event when a command is made that will cause a transient EGR condition and a later combustion event when the EGR mass fraction 244 will begin to change in response to the command, and SSFrac refers to the one of the stored values of the SS EGR fraction for the combustion event t-1-i combustion events ago. t and d are integers, and d is less than t. An EGR transient condition can occur, for example, in response to changes in the opening of the throttle valve 12, in the opening of the EGR valve 24, in pressure within the intake manifold 14, or another suitable event that causes a change in the mass flowrate of exhaust gas recirculation back to the intake manifold 14.

In various implementations, t and d may be constant values that are calibrated based on physical factors, such as cylinder volume, volume of the intake manifold 14, and volume of the EGR system through which exhaust gas travels when recirculated. In various implementations, t and/or d may be variable values and may be set by the EGR determination module 252. The EGR determination module 252 may set t and/or d, for example, using one or more functions or mappings that relate an engine load parameter, such as the APC 242, and/or the engine speed 250 to t and/or d. The one or more functions or mappings are calibrated based on the physical factors, such as the cylinder volume, the volume of the intake manifold 14, and the volume of the EGR system.

Under some circumstances, the fuel control module 228 sets the target fueling parameters 232 to provide two separate fuel injections for a combustion event. The later (second) one of the two fuel injections is performed during the compression stroke of the combustion event to provide a stratified charge within the cylinder for the combustion event. The provision of two separate fuel injections where the later one of the injections is performed during the compression stroke may provide smoother operation of the engine 8 as compared to operation using a single fuel injection. The provision of two separate fuel injections where the later one of the injections is performed during the compression stroke may additionally or alternatively decrease brake specific fuel consumption (BSFC).

Figure 3A:
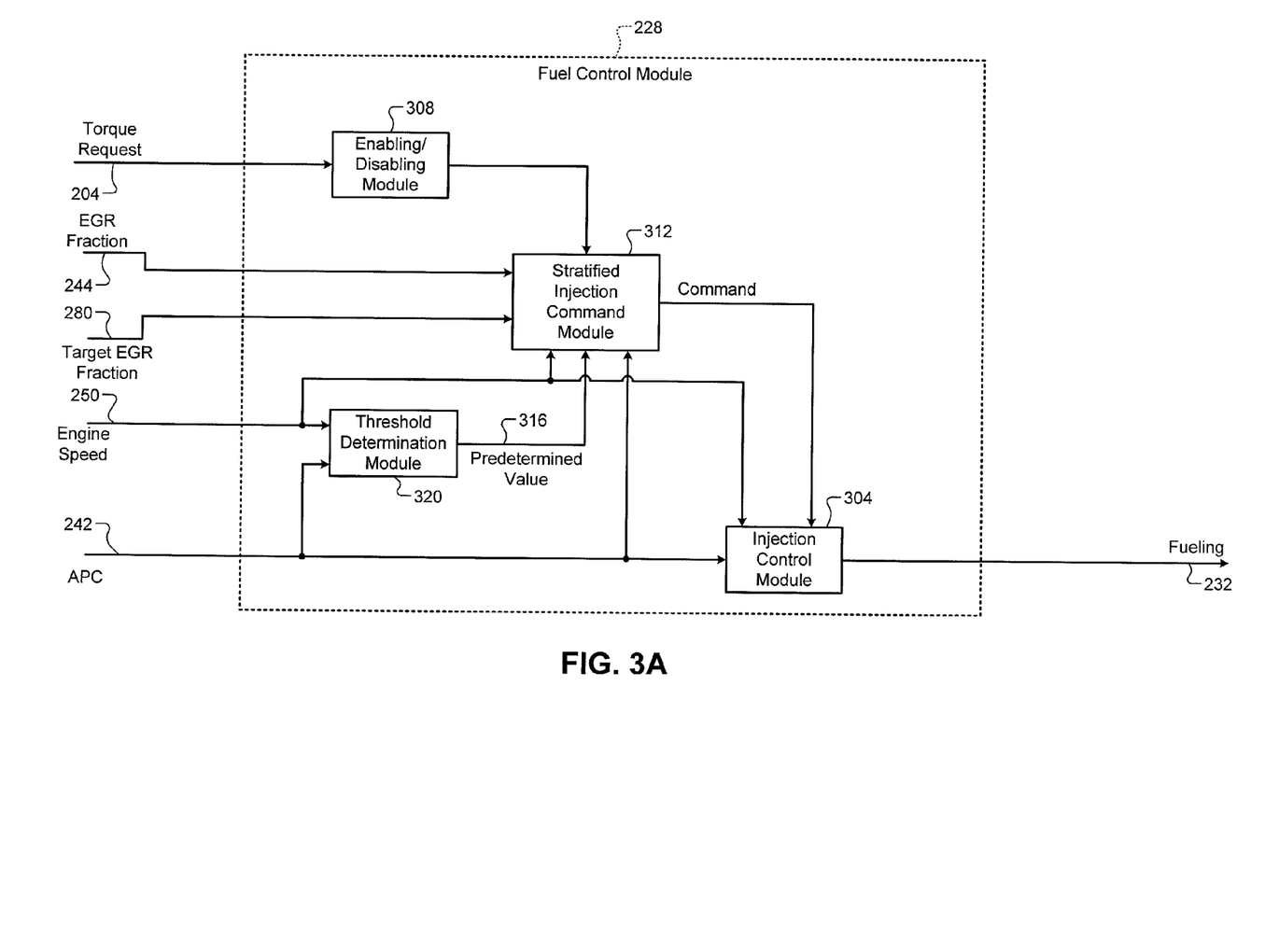
FIGS. 3A-3B are functional block diagrams example fuel control modules according to the present disclosure.

Referring now to FIG. 3A, a functional block diagram of an example implementation of the fuel control module 228 is presented. An injection control module 304 sets the target fueling parameters 232 for a combustion event of a cylinder. Generally, the injection control module 304 may set the target fueling parameters 232 for a combustion event such that fuel is provided for the combustion event in a single fuel injection.

The injection control module 304 may determine a target amount of fuel to be injected for the combustion event based on the APC 242 for the combustion event and/or one or more other suitable parameters. For example, the injection control module 304 may set the target amount of fuel based on the APC 242 and a target air/fuel mixture, such as a stoichiometric air/fuel mixture.

An enabling/disabling module 308 selectively enables and disables a stratified injection command module 312. The enabling/disabling module 308 may enable and disable the stratified injection command module 312, for example, based on the torque request 204. For example only, the enabling/disabling module 308 may enable the stratified injection command module 312 when a decrease in the torque request 204 over a predetermined period is greater than a predetermined value. Conversely, the enabling/disabling module 308 may disable the stratified injection command module 312 when a decrease in the torque request 204 over the predetermined period is less than the predetermined value. For example only, the predetermined value may be approximately 10 percent (%) or another suitable value.

Additionally or alternatively, the enabling/disabling module 308 may enable and disable the stratified injection command module 312 based on the target EGR mass fraction 280. For example only, the enabling/disabling module 308 may enable the stratified injection command module 312 when a decrease in the target EGR mass fraction 280 over a predetermined period is greater than a predetermined value. Conversely, the enabling/disabling module 308 may disable the stratified injection command module 312 when a decrease in the target EGR mass fraction 280 over the predetermined period is less than the predetermined value. For example only, the predetermined value may be approximately 10%, greater than 10%, or another suitable value. While enabling and disabling the stratified injection command module 312 based on the torque request 204 and/or the target EGR mass fraction 280 have been discussed, the enabling/disabling module 308 may enable the stratified injection command module 312 in response to the occurrence of another suitable event where the EGR mass fraction 244 for one or more combustion events is expected to increase to greater than a predetermined value.

When enabled, the stratified injection command module 312 selectively commands the injection control module 304 to provide two separate fuel injections for the combustion event. The stratified injection command module 312 selectively commands the injection control module 304 based on a difference between the EGR mass fraction 244 and the target EGR mass fraction 280. For example only, the stratified injection command module 312 may command the injection control module 304 to provide two separate fuel injections when the EGR mass fraction 244 minus the target EGR mass fraction 280 is greater than a predetermined value 316. Conversely, the stratified injection command module 312 may refrain from commanding the injection control module 304 to provide two separate fuel injections when the EGR mass fraction 244 minus the target EGR mass fraction 280 is less than the predetermined value 316.

A threshold determination module 320 may determine the predetermined value 316 based on the engine speed 250 and/or an engine load parameter, such as the APC 242. For example only, the threshold determination module 320 may increase the predetermined value 316 as the engine speed 250 increases and vice versa. The threshold determination module 320 may decrease the predetermined value 316 as the APC 242 increases and vice versa. The threshold determination module 320 may determine the predetermined value 316, for example, using one or more functions and/or mappings that relate the engine speed 250 and the APC 242 to the predetermined value 316.

In response to the command, the injection control module 304 sets the target fueling parameters 232 for the combustion event to provide two different fuel injections. The two different fuel injections for the combustion event will be referred to as first and second fuel injections.

The injection control module 304 may determine first and second target amounts of fuel for the first and second fuel injections, respectively, based on the target amount. For example only, the injection control module 304 may set the first target amount equal to the target amount multiplied by a predetermined percentage and set the second target amount equal to the target amount multiplied by a value equal to 100% minus the predetermined percentage. The injection control module 304 may determine the predetermined percentage, for example, based on the engine speed 250 and/or an engine load parameter, such as the APC 242. In various implementations, the predetermined percentage may be a fixed value.

The injection control module 304 also determines first and second starting timings for the first and second fuel injections, respectively. The first and second starting timings may correspond to crankshaft positions to begin the first and second fuel injections, respectively. The injection control module 304 may determine the first and second timings based on the engine speed 250 and/or an engine load parameter, such as the APC 242. The injection control module 304 sets the second timing such that the second fuel injection begins and ends during the compression stroke of the combustion event. The second fuel injection is performed during the compression stroke of the combustion event to provide a stratified charge.

Figure 3B:
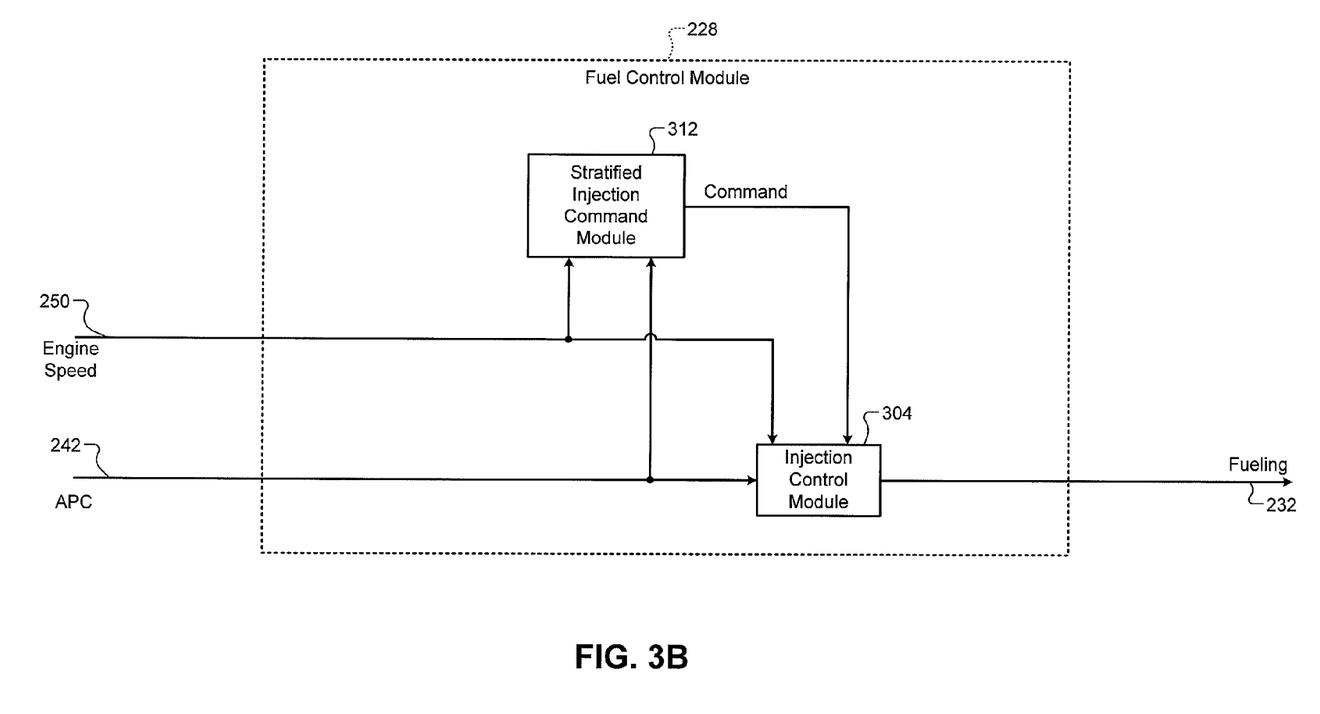

Referring now to FIG. 3B, another functional block diagram of an example of the fuel control module 228 is presented. In various implementations, the stratified injection command module 312 may selectively command the injection control module 304 to provide two separate fuel injections for the combustion event based on the engine speed 250 and/or an engine load parameter, such as the APC 242.

For example only, the stratified injection command module 312 may determine whether or not to command the injection control module 304 to provide two separate fuel injections using a mapping that indicates whether or not to command the injection control module 304 to provide two separate fuel injections based on the engine speed 250 and the engine load parameter, such as the APC 242. The entries of the mapping may be calibrated such that the stratified injection command module 312 commands the injection control module 304 to provide two separate fuel injections when, under the engine speed and engine load conditions, the use of two separate fuel injections will reduce BSFC and amounts of constituents of the resulting exhaust will be less than respective predetermined values.

Figure 4:
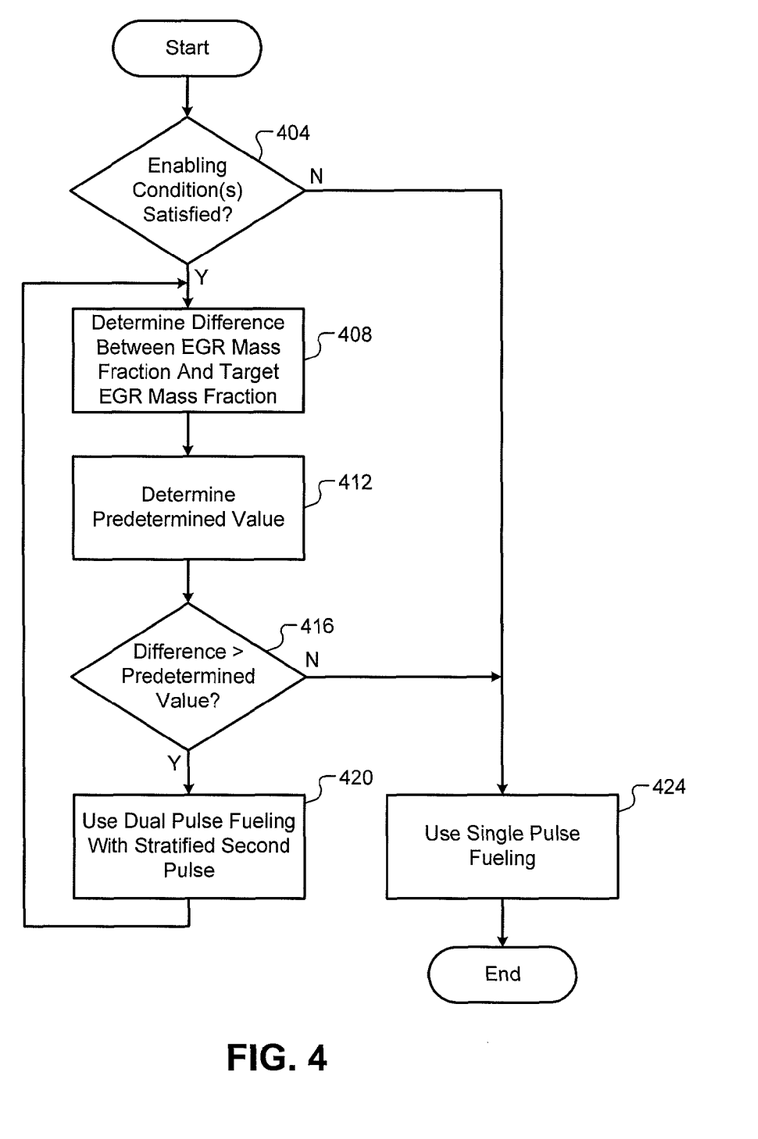
FIGS. 4-5 are flowcharts depicting example methods of controlling fueling according to the present disclosure.

Referring now to FIG. 4, a flowchart depicting an example method of controlling fueling is presented. Control may begin with 404 where the enabling/disabling module 308 determines whether one or more enabling conditions are satisfied. For example, the enabling/disabling module 308 may determine whether a decrease in the torque request 204 over a predetermined period is greater than a predetermined value and/or whether a decrease in the target EGR mass fraction 280 over a predetermined period is greater than a predetermined value. If 404 is true, the enabling/disabling module 308 enables the stratified injection command module 312, and control continues with 408. If 404 is false, the enabling/disabling module 308 disables the stratified injection command module 312, and control may transfer to 424, which is discussed further below.

At 408, the stratified injection command module 312 determines the difference between the EGR mass fraction 244 and the target EGR mass fraction 280. For example, the stratified injection command module 312 may set the difference equal to the EGR mass fraction 244 minus the target EGR mass fraction 280. At 412, the threshold determination module 320 determines the predetermined value 316. The threshold determination module 320 may determine the predetermined value 316, for example, using one or more functions and/or mappings that relate the engine speed 250 and an engine load parameter, such as the APC 242, to the predetermined value 316.

The stratified injection command module 312 determines whether the difference (between the EGR mass fraction 244 and the target EGR mass fraction 280) is greater than the predetermined value 316. If 416 is true, the stratified injection command module 312 commands the injection control module 304 to provide two separate fuel injections, and control continues with 420. If 416 is false, the stratified injection command module 312 does not command the injection control module 304 to provide two separate fuel injections, and control transfers to 424.

At 420, the injection control module 304 determines the first and second amounts and the first and second timings for the first and second fuel injections, respectively, for a combustion event. The first and second fuel injections are performed for the combustion event based on the first and second amounts and the first and second timings, respectively. The second fuel injection is performed during the compressions stroke of the combustion event to provide a stratified charge. Control may return to 408 after 420.

At 424, the injection control module 304 may set the target fueling parameters for the combustion event to provide fuel in a single fuel injection. Fuel is then injected for the combustion event in a single fuel injection. Control may end after 424. While control is shown and discussed as ending, control may instead return to 404.

Figure 5:
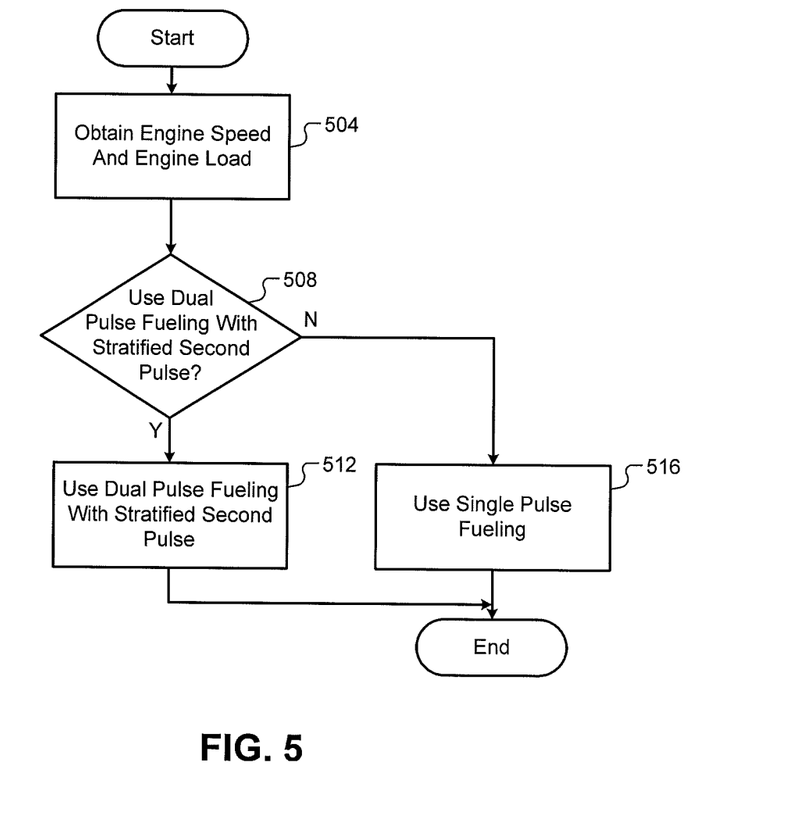

Referring now to FIG. 5, a flowchart depicting an example method of controlling fueling is presented. Control may begin with 504 where the stratified injection command module 312 receives the engine speed 250 and an engine load parameter, such as the APC 242.

At 508, the stratified injection command module 312 determines whether to command the injection control module 304 to provide two separate fuel injections for a combustion event. The stratified injection command module 312 may selectively command the injection control module 304 to provide two separate fuel injections for the combustion event based on the engine speed 250 and/or the APC 242. For example only, the stratified injection command module 312 may determine whether or not to command the injection control module 304 to provide two separate fuel injections using a mapping that indicates whether or not to command the injection control module 304 based on the engine speed 250 and the APC 242. If 508 is true, control continues with 512. If 512 is false, control continues with 516.

At 512, the injection control module 304 determines the first and second amounts and the first and second timings for the first and second fuel injections, respectively, for a combustion event. The first and second fuel injections are performed for the combustion event based on the first and second amounts and the first and second timings, respectively. The second fuel injection is performed during the compressions stroke of the combustion event to provide a stratified charge.

At 516, the injection control module 304 may set the target fueling parameters for the combustion event to provide fuel in a single fuel injection. Fuel is then injected for the combustion event in a single fuel injection. Control may end after 512 or 516. While control is shown and discussed as ending, control may instead return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A fuel control system of a vehicle, comprising:
    an injection control module that determines a first target amount of fuel for a combustion event of an engine; and
    a command module that selectively command the injection control module to provide two fuel injections when a torque request decreases and that determines whether to command the injection control module to provide the two fuel injections based on a difference between an estimated mass fraction of recirculated exhaust gas in a gas charge of the combustion event and a target mass fraction of recirculated exhaust gas for the combustion event,
    wherein, in response to the command, the injection control module:
        determines second and third target amounts of fuel based on the first target amount;
        provides a first one of the two fuel injections during the combustion event based on the second target amount; and
        provides a second one of the two fuel injections during a compression stroke of the combustion event based on the third target amount.

2. The fuel control system of claim 1 further comprising an enabling/disabling module that disables the command module when a decrease in the torque request is less than a predetermined value.

3. The fuel control system of claim 1 further comprising an enabling/disabling module that disables the command module when a decrease in the target mass fraction of recirculated exhaust gas is less than a predetermined value.

4. The fuel control system of claim 1 wherein the command module commands the injection control module to provide the two fuel injections when the difference is greater than a predetermined value.

5. The fuel control system of claim 4 further comprising a threshold determination module that determines the predetermined value based on an engine speed.

6. The fuel control system of claim 4 further comprising a threshold determination module that determines the predetermined value based on an engine load.

7. The fuel control system of claim 1 wherein the injection control module begins and ends the second one of the two fuel injections during the compression stroke of the combustion event.

8. The fuel control system of claim 1 wherein the injection control module determines the second and third target amounts further based on a predetermined percentage.

9. The fuel control system of claim 8 wherein the injection control module determines the predetermined percentage based on at least one of an engine speed and an engine load.

10. A fuel control method for a vehicle, comprising:
    determining a first target amount of fuel for a combustion event of an engine;
    determining whether to command provision of two fuel injections based on a difference between an estimated mass fraction of recirculated exhaust gas in a gas charge of the combustion event and a target mass fraction of recirculated exhaust gas for the combustion event;
    selectively commanding provision of the two fuel injections when a torque request decreases; and
    in response to the command:
        determining second and third target amounts of fuel based on the first target amount;
        providing a first one of the two fuel injections during the combustion event based on the second target amount; and
        providing a second one of the two fuel injections during a compression stroke of the combustion event based on the third target amount.

11. The fuel control method of claim 10 further comprising preventing the commanding when a decrease in the torque request is less than a predetermined value.

12. The fuel control method of claim 10 further comprising preventing the commanding when a decrease in the target mass fraction of recirculated exhaust gas is less than a predetermined value.

13. The fuel control method of claim 10 further comprising commanding provision of the two fuel injections when the difference is greater than a predetermined value.

14. The fuel control method of claim 13 further comprising determining the predetermined value based on an engine speed.

15. The fuel control method of claim 13 further comprising determining the predetermined value based on an engine load.

16. The fuel control method of claim 10 further comprising beginning and ending the second one of the two fuel injections during the compression stroke of the combustion event.

17. The fuel control method of claim 10 further comprising determining the second and third target amounts further based on a predetermined percentage.

18. The fuel control method of claim 17 further comprising determining the predetermined percentage based on at least one of an engine speed and an engine load.

\* \* \* \* \*